(12) United States Patent
Jayaraman et al.

(10) Patent No.: US 12,556,455 B2
(45) Date of Patent: *Feb. 17, 2026

(54) NETWORK CONFIGURATION VERIFICATION IN COMPUTING SYSTEMS

(71) Applicant: MICROSOFT TECHNOLOGY LICENSING, LLC, Redmond, WA (US)

(72) Inventors: Karthick Jayaraman, Kirkland, WA (US); Ryan Andrew Beckett, Redmond, WA (US); Nikolaj Skallerud Bjorner, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 43 days.

This patent is subject to a terminal disclaimer.

(21) Appl. No.: 18/370,824

(22) Filed: Sep. 20, 2023

(65) Prior Publication Data

US 2024/0015072 A1  Jan. 11, 2024

Related U.S. Application Data

(63) Continuation of application No. 17/978,081, filed on Oct. 31, 2022, now Pat. No. 11,824,727, which is a
(Continued)

(51) Int. Cl.
*G06F 15/173* (2006.01)
*H04L 41/0853* (2022.01)
(Continued)

(52) U.S. Cl.
CPC .......... *H04L 41/12* (2013.01); *H04L 41/0853* (2013.01); *H04L 41/0893* (2013.01)

(58) Field of Classification Search
CPC .. H04L 41/12; H04L 41/0853; H04L 41/0893
(Continued)

(56) References Cited

U.S. PATENT DOCUMENTS 10,797,951 B2 * 10/2020 Danait ................ H04L 41/0853
10,826,770 B2 * 11/2020 Sethi ................... H04L 41/5019
(Continued)

FOREIGN PATENT DOCUMENTS

WO  WO-2016072996 A1 * 5/2016 ......... H04L 12/6418
WO  WO-2016186605 A1 * 11/2016 ......... H04L 41/0893
(Continued)

*Primary Examiner* — Hee Soo Kim
(74) *Attorney, Agent, or Firm* — Han Gim; Newport IP, LLC (57) ABSTRACT

Techniques of network configuration verification are disclosed herein. One example process includes, upon receiving a query to determine whether a packet from a first endpoint is reachable to a second endpoint in a virtual network, identifying a network path between the first endpoint to the second endpoint in a network graph. The network graph has nodes representing corresponding enforcement points of network policies in the virtual network and edges connecting pairs of the nodes. The example process can also include generating compound function representing conjoined individual constraints of the network policies at each of the nodes in the network graph along the identified network path, compiling the generated compound function into a Boolean formula, and solving the compiled Boolean formula to determine whether an assignment of values to packet fields of the packet exists such that all the conjoined individual constraints of the compound function can be satisfied.

20 Claims, 8 Drawing Sheets

Related U.S. Application Data continuation of application No. 17/542,045, filed on Dec. 3, 2021, now Pat. No. 11,516,088.

(60) Provisional application No. 63/272,993, filed on Oct. 28, 2021.

(51) Int. Cl.
*H04L 41/0893* (2022.01)
*H04L 41/12* (2022.01)

(58) Field of Classification Search
USPC .......................................................... 709/223
See application file for complete search history.

(56) References Cited

U.S. PATENT DOCUMENTS

| | | | | |
|---|---|---|---|---|
| 10,862,749 | B1* | 12/2020 | Kiyak | H04L 41/0894 |
| 10,992,520 | B2* | 4/2021 | Lee | H04L 41/40 |
| 11,909,744 | B2* | 2/2024 | Xing | H04L 41/145 |
| 2002/0178246 | A1* | 11/2002 | Mayer | H04L 41/0894 |
| | | | | 709/223 |
| 2018/0309632 | A1* | 10/2018 | Kompella | H04L 41/0895 |
| 2018/0351845 | A1* | 12/2018 | Horn | H04L 43/50 |
| 2019/0238410 | A1* | 8/2019 | Kang | H04L 41/40 |
| 2022/0200868 | A1* | 6/2022 | Sobhani | H04L 41/145 |

FOREIGN PATENT DOCUMENTS

| | | | | |
|---|---|---|---|---|
| WO | WO-2017014770 | A1 * | 1/2017 | ......... H04L 41/0893 |
| WO | WO-2021006869 | A1 * | 1/2021 | ............ H04L 45/02 |
| WO | WO-2021108652 | A1 * | 6/2021 | ............ H04L 41/08 |

* cited by examiner

NETWORK CONFIGURATION VERIFICATION IN COMPUTING SYSTEMS

CROSS-REFERENCE TO RELATED APPLICATION(S)

This application is a non-provisional of and claims priority to U.S. patent application Ser. No. 17/978,081 which claims priority to Ser. No. 17/542,045 which claims priority to U.S. Provisional Application No. 63/272,993, filed on Oct. 28, 2021, the contents of each application are hereby expressly incorporated here by reference in their entirety.

BACKGROUND

Distributed computing systems typically include routers, switches, bridges, and other types of network devices that interconnect large numbers of servers, network storage devices, or other computing devices. The individual servers can host one or more virtual machines ("VMs"), containers, virtual switches, or other virtualized functions. The virtual machines or containers can facilitate execution of suitable applications for individual users to provide to the users desired cloud services or other suitable computing services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Datacenters and other large-scale distributed computing systems can provide computing resources such as processing power and data storage as computing services accessible to tenants such as organizations via a computer network. Instead of deploying a local enterprise network, an organization can instead deploy a virtual network in remote datacenters provided by a cloud computing provider. For example, a virtual private network (VPN) can link various branches of an organization while data storage at remote datacenters can hold enterprise data of the organization. Users of the organization can access various resources on the virtual network via a computer network such as the Internet. As such, the organization can offload certain hardware/software deployment, maintenance, upgrade, or other administrative tasks of various computing resources to the cloud computing provider.

Virtual networks deployed by tenants in datacenters can have complex network policies. Network policies are typically rules embodied in suitable data structures that specify how certain network traffic is to be processed in a computer network. For example, a tenant can use virtual networks to isolate a set of virtual machines in one virtual network from other virtual machines in additional virtual networks via suitable rules restricting network traffic to/from the one virtual network. The tenant can also use rules referred to as Network Security Groups (NSGs) or Application Security Groups (ASGs) to enforce reachability restrictions on packets that are transmitted/received by certain virtual networks and/or endpoints thereof. For example, a NSG can include rules that either allow a packet to be forwarded or dropped based on metadata contained in certain header fields of the packet. The tenant can also design user-defined routes that determine how packets are forwarded from various endpoints such as virtual machines or virtual networks. The tenant can also group two virtual networks for peer-to-peer communication or configure a virtual wide area network (WAN) connecting endpoints in distant virtual networks. In another example, the tenant can configure service endpoints and private endpoints to connect VMs to computing services provided by the cloud computing provider via suitable rules.

Managing large numbers of network policies with different semantics in virtual networks can be difficult for tenants. Individual network policies are typically not amenable to human inspection unless the rules of the network policies are exceedingly trivial. The difficulty of managing network policies only grows with scale. For example, a network policy with three rules may be manually inspected. However, a set of hundreds of network policies each having hundreds of rules is no longer amenable to human inspection.

As such, tenants managing complex network policies often make configuration changes that inadvertently regress safety and/or availability of various resources on the tenant's virtual networks. Indeed, such misconfiguration of network policies of virtual networks tends to be common. For instance, a tenant can have several virtual networks that were originally connected in a mesh topology. Core services are deployed in the virtual networks and have reachability to the Internet with the mesh topology. During a test, a developer of the tenant creates a new virtual hub that receives all traffic to Internet from the virtual networks and routes the received traffic to a firewall. However, the developer forgets to configure the firewall to handle all the traffic to/from the Internet. As a result, all traffic to/from the Internet is blackholed while the core services can no longer be reached via the Internet. In another example, when tenants misconfigure NSG or ASG policies, reachability with SQL Managed Incident (SQMI) backend services can be blocked, and thus causing disruptions with data backups.

Verifying network policies and/or changes thereof for virtual networks can be difficult. Traditionally, network policy verification tools express verification questions directly in low-level languages of solvers. For example, to answer a reachability question on routing from a first endpoint to a second endpoint, a verifier can translate a routing table and a reachability query into a Boolean logic formula that is satisfiable if and only if reachability is preserved by the routing table. The verifier can then use a solver, such as the Z3 theorem prover provided by Microsoft Corporation of Redmond, Washington, to derive a reachability result. This approach is not viable for verifying large numbers of network policy types for virtual networks, such as NSGs, route tables, firewalls, service endpoints, private endpoints, service firewalls, ASGs, virtual WAN, and virtual peering. The translations of such network policies directly to low-level languages of solvers are complex while maintaining correctness of such translations is difficult. In addition, special skills and expertise working with solvers are needed for performing such translations.

Several embodiments of the disclosed technology can address several aspects of the foregoing difficulty by implementing a network verifier configured to translate network policies of computer networks (e.g., virtual networks) into Boolean logic formulas via an intermediate representation (IR). In certain implementations, the network verifier can be configured to retrieve network policies of one or more virtual networks of a tenant from a database such as a deployment configuration database maintained by a resource manager or other suitable entities of a cloud computing platform. Example network policies can include NSGs, route tables, firewalls, service endpoints, private endpoints, service firewalls, ASGs, virtual WAN, virtual peering, or other suitable types of network rules.

The network verifier can then be configured to convert the retrieved network policies into a network graph having multiple nodes each representing a policy enforcement point and interconnected with one another by edges each representing packet transmissions and/or transformations. Each of the edges can also carry an annotation that describes a network policy effective for the corresponding edges. For instance, example policy enforcement points can include VMs, NSGs on network interface cards (NICs), subnets inbound and outbound, virtual network inbound and outbound, etc. Thus, an example network graph can include a node representing a first VM connected by an edge to a node representing an outbound NSG of a NIC connected to the first VM. The edge representing a packet transmission or transformation, e.g., the packet has a source IP address for the VM/NIC transmitted from the VM to the NIC. The example network graph can also include another node representing a virtual network connected by an additional edge to the outbound NSG. The additional edge represents a packet transformation that the packet is allowed by the NSG to be transmitted to the virtual network. The network graph can also include a node representing another inbound NSG on another NIC connected to the virtual network and another node representing a second VM connected to the other NIC.

Upon identifying the nodes and edges of the network graph, the network verifier can be configured to encode each node in the network graph for evaluating whether a packet is allowed to be forwarded or is to be dropped. For example, a node representing an NSG can be encoded using a recursive function "Allow" that evaluates a packet received at the node to produce a Boolean output (illustratively named "Zen") indicating whether the packet is allowed or dropped in C# language as follows:

```
Zen<bool> Allow(Nsg nsg, Zen<Packet> pkt, int i) {
    if (i >= nsg.Rules.Length)
        return false; //if index of rules exceed max, return//
    var rule = nsg.Rules[i]; //process Rule[i]//
    return If(Matches(rule, pkt), rule.Permit, Allow(nsg, pkt, i+1)); // if packet matches Rule[i], output permit from rule; otherwise, call next rule//
}
```

A shown above, the function "Allow" is implemented as a recursive function that takes as input an NSG having one or more rules, a packet modeled as a Zen<Packet> type, and an index of the rule that is to be processed (set to zero on the first call), and finally provides an output of type Zen<bool> indicating if the packet was dropped or allowed.

Upon constructing the network graph, the network verifier can receive a query regarding, for example, whether a packet from the first VM can reach the second VM in the virtual network. The query can also include IP addresses of the first and second VMs as well as other suitable information, such as port numbers. In response to receiving the query, the network verifier can be configured to trace one or more network paths between the first and second VMs in the virtual network as represented on the network graph. For each of the one or more network paths, the network verifier can be configured to generate a compound function that conjoins all the recursive functions of the various nodes along the traced one or more network paths. For example, the compound function can take an output from a first recursive function of a first node as input to a second recursive function at a second node downstream of the first node. The compound function can repeat such conjoining operations until all recursive functions along a network path is processed.

The network verifier can then convert the generated compound function of the traced network path into a logic representation such as an Abstract Syntax Tree (AST) that represents a Boolean formula of the compound function as a logic tree. For example, the code for the recursive function above can be initially converted into a list of tokens describing the different parts of the code. The list of tokens can then be parsed to identify function calls, function definitions, groupings, etc. arranged as a tree to represent a structure of the code. The logic tree can then be converted into different kinds of logic code. For example, the output code can be JavaScript, machine code, or other suitable types of code.

Based on the AST corresponding to the compound function, the network verifier can then be configured to use a solver, e.g., the Z3 theorem prover to determine whether a packet having a source IP address value and source port value of the first VM and a destination IP address value and destination port value of the second VM can reach the second VM. The reachability between the first and second VMS is confirmed only if there exists an assignment of values to the packet fields such that all the constraints of the compound function are satisfied.

In certain embodiments, the network verifier can also be configured to output evaluation results at each node on the network graph. For example, the following illustrates an evaluation result of a routing table:

```
{
    Type: "RoutingTable",
    Destination: "10.111.0.0/16",
    NextHop: "VnetLocal",
}
```

As shown above, the example shows that a packet is forwarded to a node with a destination IP of "10.111.0.0/16" in "VnetLocal." In another example, the following illustrates another evaluation result of an NSG that denied access to a packet:

```
{
    Type: "NetworkSecurityGroup",
    Description: "Deny to Internet",
    Destination: "0.0.0.0/0",
    Source: "*",
    DestinationPorts: "*",
    SourcePorts: "*",
    Priority: 65000,
}
```

In the example above, all traffic to the Internet is blocked at the NSG node.

Several embodiments of the network verifier described above can thus provide a tool that allows tenants to efficiently test and/or troubleshoot network configuration issues in virtual networks. The network verifier can receive a query as input, analyzes network paths in the virtual networks, collect constraints along the network path, and conjoin the collected constraints. The network verifier can then compile the conjoined constraints into a logic representation and use a solver to solve the conjoined constraints to determine whether reachability between two endpoints in the virtual network is preserved. Several embodiments of the network verifier can also output and indicate to the tenants which node on the network graph that caused a packet to be dropped. As such, tenants can readily test modifications of network policies and troubleshoot any misconfigurations in the virtual networks before such modification is deployed in the virtual networks.

DETAILED DESCRIPTION

Certain embodiments of systems, devices, components, modules, routines, data structures, and processes for network access verification in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

As used herein, the term "distributed computing system" generally refers to an interconnected computer system having multiple network nodes that interconnect a plurality of servers or hosts to one another and/or to external networks (e.g., the Internet). The term "network node" generally refers to a physical network device. Example network nodes include routers, switches, hubs, bridges, load balancers, security gateways, or firewalls. A "host" generally refers to a physical computing device. In certain embodiments, a host can be configured to implement, for instance, one or more virtual machines, virtual switches, or other suitable virtualized components. For example, a host can include a server having a hypervisor configured to support one or more virtual machines, virtual switches, or other suitable types of virtual components. In other embodiments, a host can be configured to execute suitable applications directly on top of an operating system.

A computer network can be conceptually divided into an overlay network implemented over an underlay network in certain implementations. An "overlay network" generally refers to an abstracted network implemented over and operating on top of an underlay network. The underlay network can include multiple physical network devices interconnected with one another. An overlay network can include one or more virtual networks. A "virtual network" generally refers to an abstraction of a portion of the underlay network in the overlay network. A virtual network can include one or more virtual end points referred to as "tenant sites" individually used by a "tenant" or one or more users of the tenant to access the virtual network and associated computing, storage, or other suitable resources. A tenant site can host one or more tenant end points ("TEPs"), for example, virtual machines. The virtual networks can interconnect multiple TEPs on different hosts.

Virtual network nodes in the overlay network can be connected to one another by virtual links individually corresponding to one or more network routes along one or more physical network devices in the underlay network. In other implementations, a computer network can only include the underlay network. As used herein, a "network route" or "network path" generally refers to a sequence of one or more network nodes a packet traverses from a source (e.g., a first host) to reach a destination (e.g., a second host). A "round-trip" network route generally refers to a pair of inbound and outbound network paths between a source and a destination. In some examples, the inbound and outbound network paths can be symmetrical, e.g., having the same sequence of intermediate network nodes in reverse directions. In other examples, the inbound and outbound network paths can be asymmetrical, e.g., having different sequences and/or intermediate network nodes in reverse directions.

As used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. Typically, the control data can be contained in headers and/or trailers of a packet. The headers and trailers can include one or more data field containing suitable information.

Figure 1:
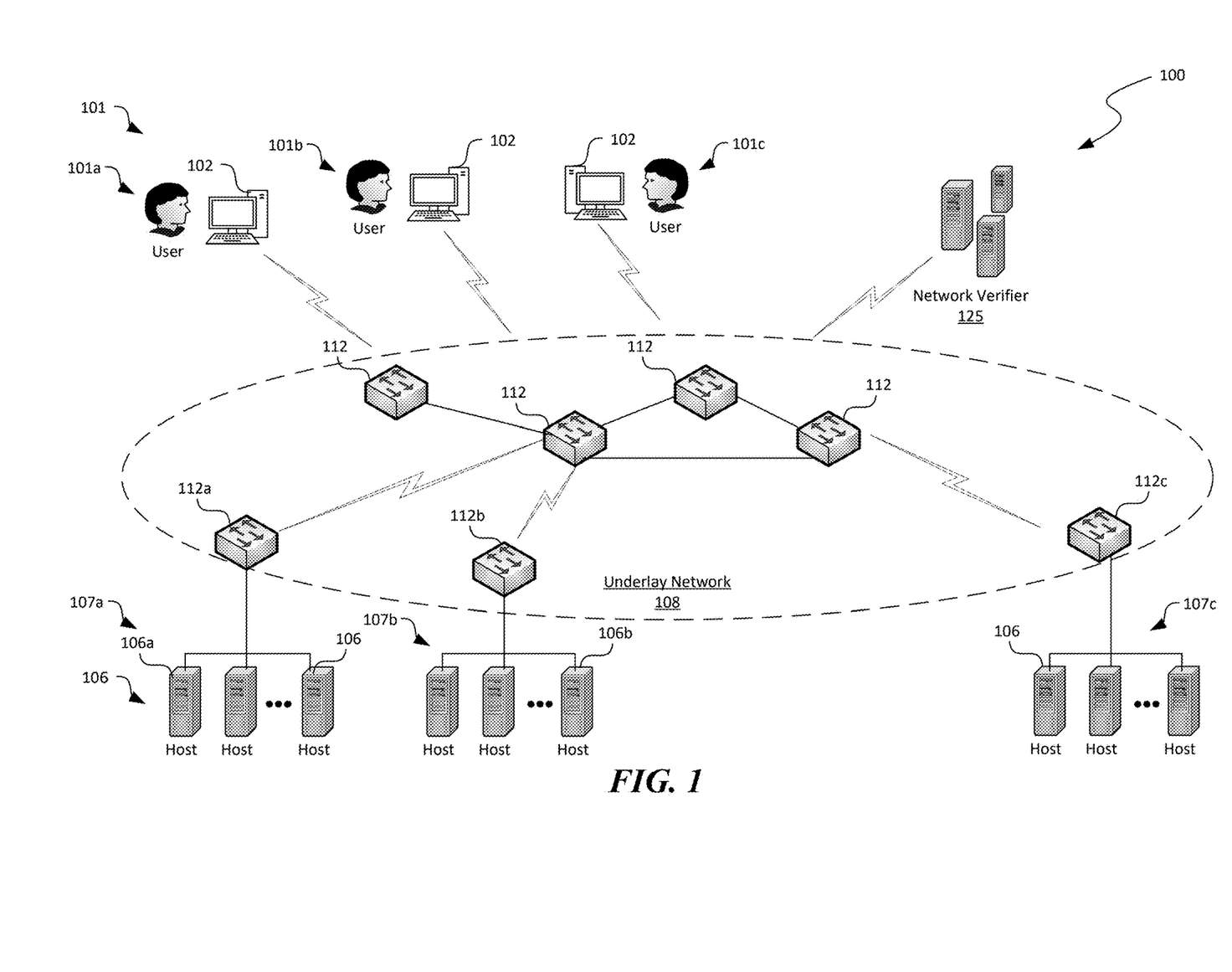
FIG. 1 is a schematic diagram illustrating a distributed computing system implementing network access verification in accordance with embodiments of the disclosed technology.

FIG. 1 is a schematic diagram illustrating a distributed computing system 100 implementing network access verification in accordance with embodiments of the disclosed technology. As shown in FIG. 1, the distributed computing system 100 can include an underlay network 108 interconnecting a plurality of hosts 106, a plurality of client devices 102 associated with corresponding users 101, and a network verifier 125 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, servers, and/or other suitable components in suitable configurations.

As shown in FIG. 1, the underlay network 108 can include one or more network nodes 112 that interconnect the multiple hosts 106 and the client device 102 of the users 101. In certain embodiments, the hosts 106 can be organized into racks, action zones, groups, sets, or other suitable divisions. For example, in the illustrated embodiment, the hosts 106 are grouped into three clusters identified individually as first, second, and third clusters 107a-107c. The individual clusters 107a-107c are operatively coupled to a corresponding network nodes 112a-112c, respectively, which are commonly referred to as "top-of-rack" network nodes or "TORs." The TORs 112a-112c can then be operatively coupled to additional network nodes 112 to form a computer network in a hierarchical, flat, mesh, or other suitable topologies. The underlay network 108 can allow communications among hosts 106, the network verifier 125, and the client devices 102 of the users 101. In other embodiments, the multiple clusters 107a-107c may share a single network node 112 or can have other suitable arrangements.

The hosts 106 can individually be configured to provide computing, storage, and/or other cloud or other suitable types of computing services to the users 101. For example, as described in more detail below with reference to FIG. 2, one of the hosts 106 can initiate and maintain one or more virtual machines 144 (shown in FIG. 2) or containers (not shown) upon requests from the users 101. The users 101 can then utilize the provided virtual machines 144 or containers to perform database, computation, communications, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for one or more of the users 101a-101c.

The client devices 102 can each include a computing device that facilitates the users 101 to access computing services provided by the hosts 106 via the underlay network 108. In the illustrated embodiment, the client devices 102 individually include a desktop computer. In other embodiments, the client devices 102 can also include laptop computers, tablet computers, smartphones, or other suitable computing devices. Though three users 101a-101c are shown in FIG. 1 for illustration purposes, in other embodiments, the distributed computing system 100 can facilitate any suitable numbers of users 101 to access suitable computing services provided by the distributed computing system 100.

Figure 2:
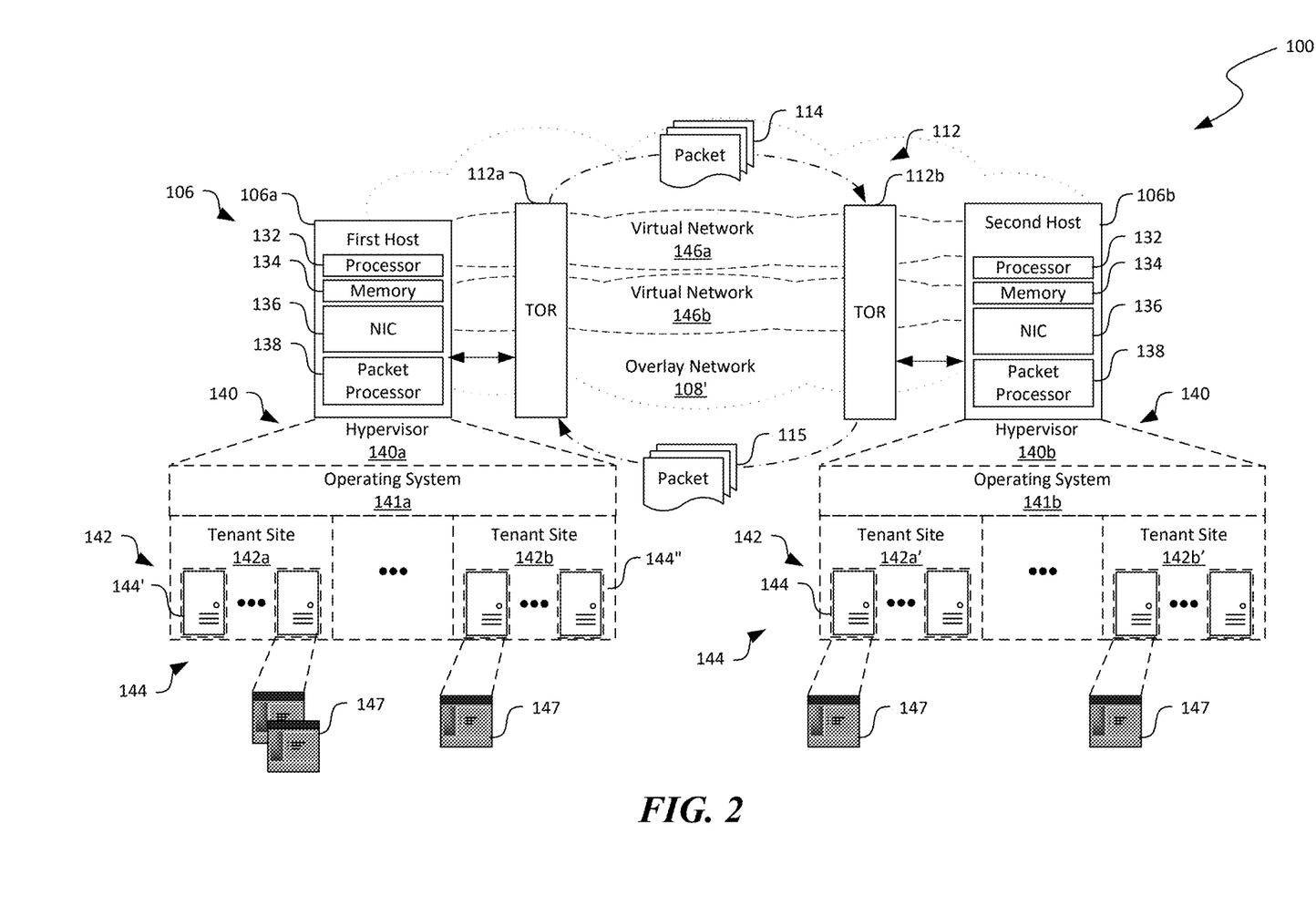
FIG. 2 is a schematic diagram illustrating certain hardware/software components and operations of the distributed computing system of FIG. 1 in accordance with embodiments of the disclosed technology.

The network verifier 125 can be configured to allow the users 101 to query accessibility between endpoints in the virtual network 146 (shown in FIG. 2). Though the network verifier 125 is shown in FIG. 1 as a single entity, in certain implementations, the network verifier 125 can be implemented in a distributed manner. For instance, one or more parts of logic of the network verifier 125 can be distributedly executed on one or more of the hosts 106 or virtual machines 144. For example, the individual hosts 106 can include certain instructions execution of which cause a first host 106a to convert network policies into a network graph while a second host 106b can independently traceroute a network path from a first endpoint to a second endpoint. Example components and operations of the network verifier 125 are described in more detail below with reference to FIGS. 3A and 3B.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, a network interface card 136, and a packet processor 138 operatively coupled to one another. In other embodiments, the hosts 106 can also include input/output devices configured to accept input from and provide output to an operator and/or an automated software controller (not shown), or other suitable types of hardware components.

The processor 132 can include a microprocessor, caches, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 3A-5B). Though only one processor 132 and one memory 134 are shown in the individual hosts 106 for illustration in FIG. 2, in other embodiments, the individual hosts 106 can include two, six, eight, or any other suitable number of processors 132 and/or memories 134.

The first host 106a and the second host 106b can individually contain instructions in the memory 134 executable by the processors 132 to cause the individual processors 132 to provide a hypervisor 140 (identified individually as first and second hypervisors 140a and 140b) and an operating system 141 (identified individually as first and second operating systems 141a and 141b). Even though the hypervisor 140 and the operating system 141 are shown as separate components, in other embodiments, the hypervisor 140 can operate on top of the operating system 141 executing on the hosts 106 or a firmware component of the hosts 106.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). For example, the first host 106a can execute an application 147 that is configured to provide a computing service that monitors online trading and distribute price data to multiple users 101 subscribing to the computing service. The virtual machines 144 on the virtual networks 146 can also communicate with one another via the underlay network 108 (FIG. 1) even though the virtual machines 144 are located on different hosts 106.

Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable network addresses. To facilitate communications among the virtual machines 144, virtual switches (not shown) can be configured to switch or filter packets 114 directed to different virtual machines 144 via the network interface card 136 and facilitated by the packet processor 138.

As shown in FIG. 2, to facilitate communications with one another or with external devices, the individual hosts 106 can also include a network interface card ("NIC") 136 for interfacing with a computer network (e.g., the underlay network 108 of FIG. 1). A NIC 136 can include a network adapter, a LAN adapter, a physical network interface, or other suitable hardware circuitry and/or firmware to enable communications between hosts 106 by transmitting/receiving data (e.g., as packets) via a network medium (e.g., fiber optic) according to Ethernet, Fibre Channel, Wi-Fi, or other suitable physical and/or data link layer standards. During operation, the NIC 136 can facilitate communications to/from suitable software components executing on the hosts 106. Example software components can include the virtual switches 141, the virtual machines 144, applications 147 executing on the virtual machines 144, the hypervisors 140, or other suitable types of components.

In certain implementations, a packet processor 138 can be interconnected to and/or integrated with the NIC 136 to facilitate network traffic operations for enforcing communications security, performing network virtualization, translating network addresses, maintaining/limiting a communication flow state, or performing other suitable functions. In certain implementations, the packet processor 138 can include a Field-Programmable Gate Array ("FPGA") integrated with the NIC 136.

An FPGA can include an array of logic circuits and a hierarchy of reconfigurable interconnects that allow the logic circuits to be "wired together" like logic gates by a user after manufacturing. As such, a user 101 can configure logic blocks in FPGAs to perform complex combinational functions, or merely simple logic operations to synthesize equivalent functionality executable in hardware at much faster speeds than in software. In the illustrated embodiment, the packet processor 138 has one interface communicatively coupled to the NIC 136 and another coupled to a network switch (e.g., a Top-of-Rack or "TOR" switch) at the other. In other embodiments, the packet processor 138 can also include an Application Specific Integrated Circuit ("ASIC"), a microprocessor, or other suitable hardware circuitry. In any of the foregoing embodiments, the packet processor 138 can be programmed by the processor 132 (or suitable software components associated therewith) to route packets inside the packet processor 138 to achieve various aspects of time-sensitive data delivery, as described in more detail below with reference to FIGS. 3A-5B.

In operation, the processor 132 and/or a user 101 (FIG. 1) can configure logic circuits in the packet processor 138 to perform complex combinational functions or simple logic operations to synthesize equivalent functionality executable in hardware at much faster speeds than in software. For example, the packet processor 138 can be configured to process inbound/outbound packets for individual flows according to configured network policies or rules contained in a flow table such as a MAT. The flow table can contain data representing processing actions corresponding to each flow for enabling private virtual networks with customer supplied address spaces, scalable load balancers, security groups and Access Control Lists ("ACLs"), virtual routing tables, bandwidth metering, Quality of Service ("QoS"), etc.

As such, once the packet processor 138 identifies an inbound/outbound packet as belonging to a particular flow, the packet processor 138 can apply one or more corresponding network policies in the flow table before forwarding the processed packet to the NIC 136 or TOR 112. For example, as shown in FIG. 2, the application 147, the virtual machine 144, and/or other suitable software components on the first host 106a can generate an outbound packet 114 destined to, for instance, other applications 147 at the second host 106b. The NIC 136 at the first host 106a can forward the generated packet 114 to the packet processor 138 for processing according to certain policies in a flow table. Once processed, the packet processor 138 can forward the outbound packet 114 to the first TOR 112a, which in turn forwards the packet to the second TOR 112b via the overlay/underlay network 108 and 108'.

The second TOR 112b can then forward the packet 114 to the packet processor 138 at the second host 106b to be processed according to other network policies in another flow table at the second host 106b. If the packet processor 138 cannot identify a packet as belonging to any flow, the packet processor 138 can forward the packet to the processor 132 via the NIC 136 for exception processing. In another example, when the first TOR 112a receives an inbound packet 115, for instance, from the second host 106b via the second TOR 112b, the first TOR 112a can forward the packet 115 to the packet processor 138 to be processed according to a network policy associated with a flow of the packet 115. The packet processor 138 can then forward the processed packet 115 to the NIC 136 to be forwarded to, for instance, the application 147 or the virtual machine 144.

Managing large numbers of network policies with different semantics in virtual networks 146 can be difficult for tenants. Individual network policies are typically not amenable to human inspection unless the rules of the network policies are exceedingly trivial. The difficulty of managing network policies only grows with scale. For example, a network policy with three rules may be manually inspected. However, a set of hundreds of network policies each having hundreds of rules is no longer amenable to human inspection. As such, tenants managing complex network policies often make configuration changes that inadvertently regress safety and/or availability of various resources on the tenant's virtual networks. Several embodiments of the disclosed technology can address several aspects of the foregoing difficulty by implementing the network verifier 125 configured to translate network policies of computer networks (e.g., virtual networks 146) into Boolean logic formulas via an intermediate representation (IR), e.g., a network graph. The network verifier 125 can then utilize a suitable solver of the Boolean logic formula to answer whether two endpoints in the virtual networks 146 can reach each other, as described in more detail below with reference to FIGS. 3A-6.

Figure 3A:
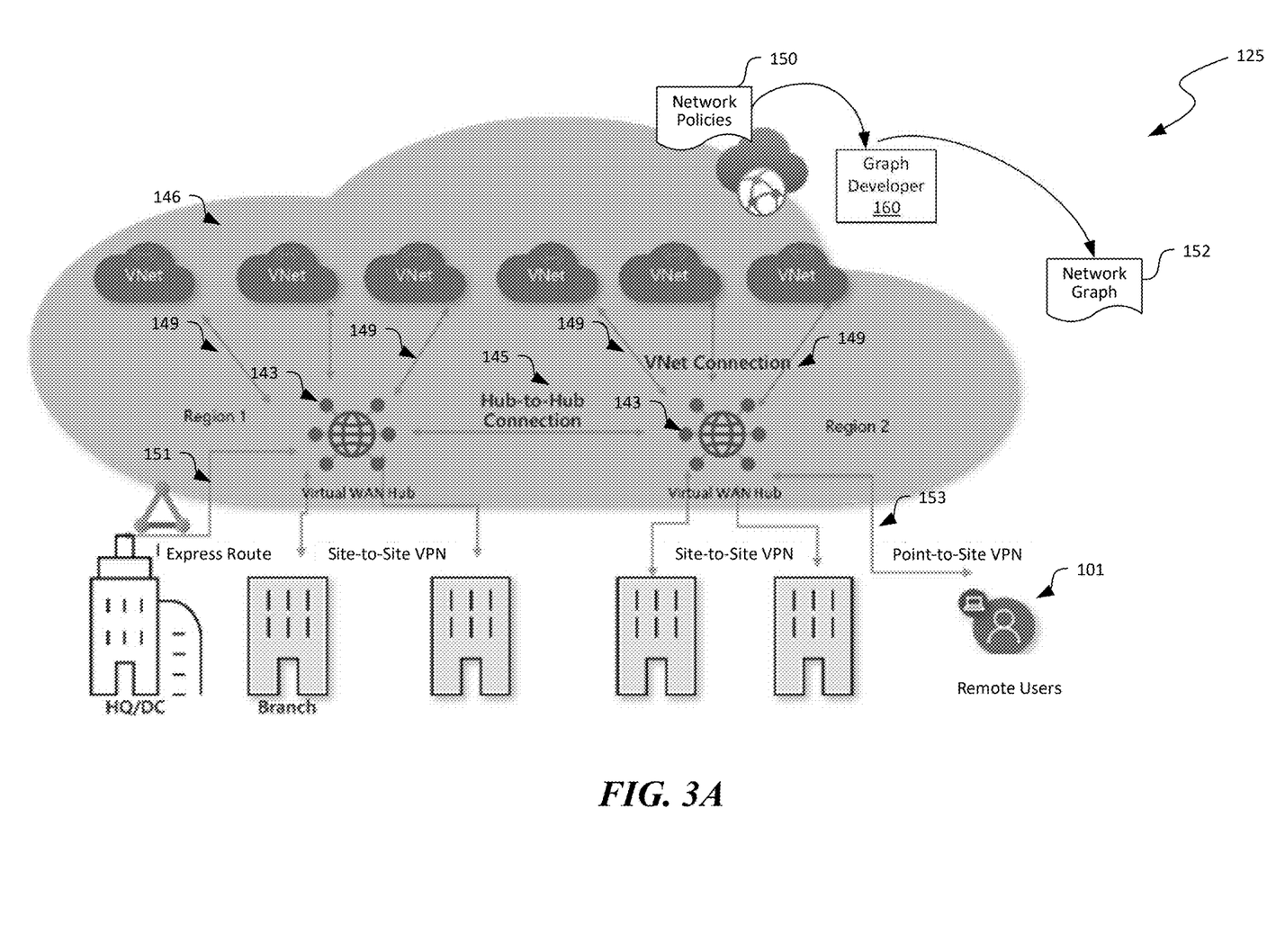
FIGS. 3A and 3B are schematic diagrams illustrating example components and operations of a network verifier suitable for verifying network access in the distributed computing system of FIG. 1 in accordance with embodiments of the disclosed technology.
Figure 3B:
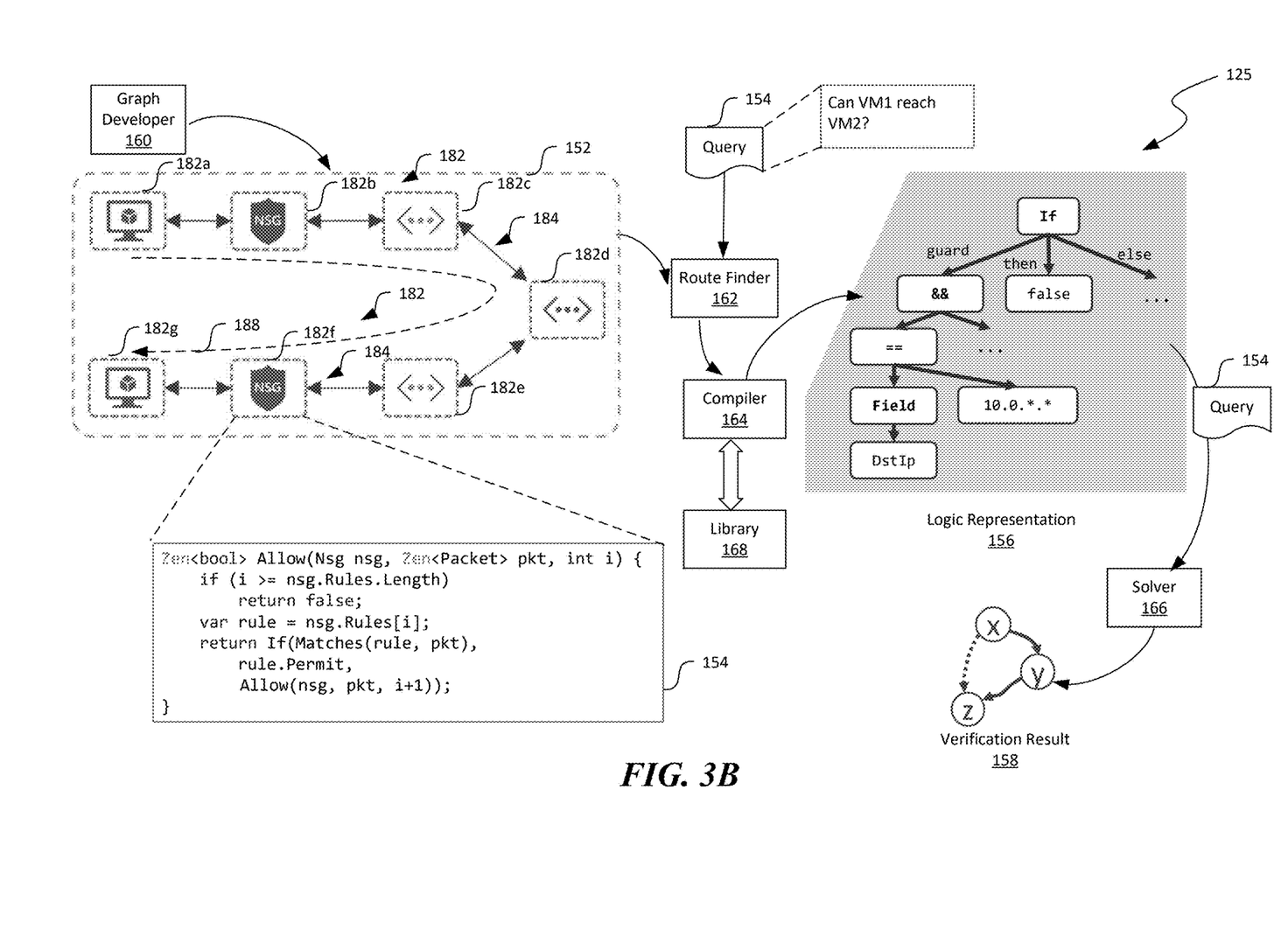

FIGS. 3A and 3B are schematic diagrams illustrating example components and operations of a network verifier 125 suitable for verifying network access in the distributed computing system 100 of FIG. 1 in accordance with embodiments of the disclosed technology. As shown in FIGS. 3A and 3B, the network verifier 125 can include a graph developer 160, a route finder 162, a compiler 164, and a solver 166 operatively coupled to one another. Though the foregoing components of the network verifier 125 are shown in FIGS. 3A and 3B for illustration purposes, in other embodiments, the network verifier 125 can include interface, network, database, or other suitable components in addition to or in lieu of those illustrated in FIGS. 3A and 3B. For instance, one or more of the foregoing components (e.g., the solver) may be separate from the network verifier 125.

As shown in FIG. 3A, the graph developer 130 can be configured to receive network policies 150 from, for example, a database such as a deployment configuration database (not shown) maintained by a resource manager of a cloud computing platform. The retrieved network policies 150 can include data representing organization of deployment of virtual networks 146 of a tenant. For instance, the illustrated example organization includes virtual WAN hubs 143 connecting multiple sites (e.g., HQ and Branches) in different regions (e.g., "Region 1" and "Region 2") via site-to-site VPNs. The virtual WAN hubs 143 are also connected to multiple virtual networks 146 via corresponding virtual network connections 149 and to each other via a hub-to-hub connection 145. The organization can also include an express route connection 151 to the head quarter (shown as "HQ/DC") as well as point-to-site VPN connections 153 to remote users 101. Example network policies can include NSGs, route tables, firewalls, service endpoints, private endpoints, service firewalls, ASGs, virtual WAN, virtual peering, or other suitable types of network policies implemented at various nodes in the virtual networks 146.

Upon receiving the network policies 150, the graph developer 130 can be configured to convert the retrieved network policies 150 into a network graph 152 having multiple nodes 182 each representing a policy enforcement point and interconnected with one another by edges 184 representing packet transmissions and/or transformations, as shown in FIG. 3B. The edges 184 can also each carry an annotation 186 (shown in FIG. 4) that describes a network policy effective for the edges 184. For instance, example policy enforcement points can include VMs, NSGs on network interface cards (NICs), subnets inbound and outbound, virtual network inbound and outbound, etc. Thus, an example network graph in FIG. 3B includes a node 182a representing a first VM connected by an edge 184 to a node 182b representing an outbound NSG of a NIC connected to the first VM. The edge 184 representing a packet transmission or transformation, e.g., the packet has a source IP address for the VM/NIC transmitted from the VM to the NIC. The example network graph 152 can also include additional nodes 182c and 182d representing a subnet and a virtual network 144 (shown in FIG. 2) connected by additional edges 144. The network graph 152 can also include additional nodes 182e, 182f, and 182g representing another subnet connected to the virtual network 144, an inbound NSG corresponding to a second VM on another NIC, and the second VM connected to the other NIC.

Upon identifying the nodes 182 and edges 184 of the network graph 152, the graph developer 160 can be configured to encode each node 182 in the network graph 152 for evaluating whether a packet is allowed to be forwarded or dropped. For example, as shown in FIG. 3B, a node 182f representing an NSG can be encoded using a recursive function "Allow" that evaluates a packet received at the node to produce a Boolean output (illustratively named "Zen") indicating whether the packet is allowed or dropped in C# language as follows:

```
Zen<bool> Allow(Nsg, Zen<Packet> pkt, int i) {
    if (i >= nsg.Rules.Length)
        return false; //if index of rules exceed max, return//
    var rule = nsg.Rules[i]; //process Rule[i]//
    return If(Matches(rule, pkt), rule.Permit, Allow(nsg, pkt, i+1)); // if packet matches Rule[i], output permit from rule; otherwise, call next rule//
}
```

A shown above, the function "Allow" is implemented as a recursive function that takes as input an NSG having one or more rules, a packet modeled as a Zen<Packet> type, and an index of the rule that is to be processed (set to zero on the first call), and finally provides an output of type Zen<bool> indicating if the packet was dropped or allowed. Another example network graph 152 is described in more detail below with reference to FIG. 4.

Upon constructing the network graph 152, the network verifier 125 can receive a query 154 from a network administrator or other suitable entities regarding, for example, whether a packet from the first VM can reach the second VM in the virtual network 144, as shown in FIG. 3B. The query 154 can also include IP addresses of the first and second VM as well as port identifiers or other suitable information. In response to receiving the query 154, the route finder 162 can be configured to trace one or more network paths 188 between nodes 182a and 182g representing the first and second VMs in the virtual network 144 on the network graph 152. For each of the one or more network paths 188, the route finder 162 can be configured to generate a compound function 190 (shown in FIG. 5) that conjoins all the recursive functions 154 of the various nodes 182 along the traced one or more network paths 188. For example, the compound function 190 can take an output from a first recursive function of a first node 182a as input to a second recursive function at a second node 182b downstream of the first node 182a. The compound function 190 can repeat such conjoining operations until all recursive functions along a network path 188 is processed. An example compound function 190 is described in more detail below with reference to FIG. 5.

The compiler 164 can then use a library 168 to convert the generated compound function 190 of the network path 188 from the route finder 162 into a logic representation 156 using, for example, Abstract Syntax Tree (AST) to represent a Boolean logic formula of the compound function, as shown in FIG. 3B. For example, the code for the recursive function above can be initially converted into a list of tokens describing the different parts of the C# code. The list of tokens can then be parsed to identify function calls, function definitions, groupings, etc. arranged as a tree to represent a structure of the C# code. The tree can then be converted into different kinds of code. For example, the output code can be JavaScript, machine code, or other suitable types of code. An example library for converting the compound function can be retrieved from https://github.com/microsoft/zen.

Figure 5:
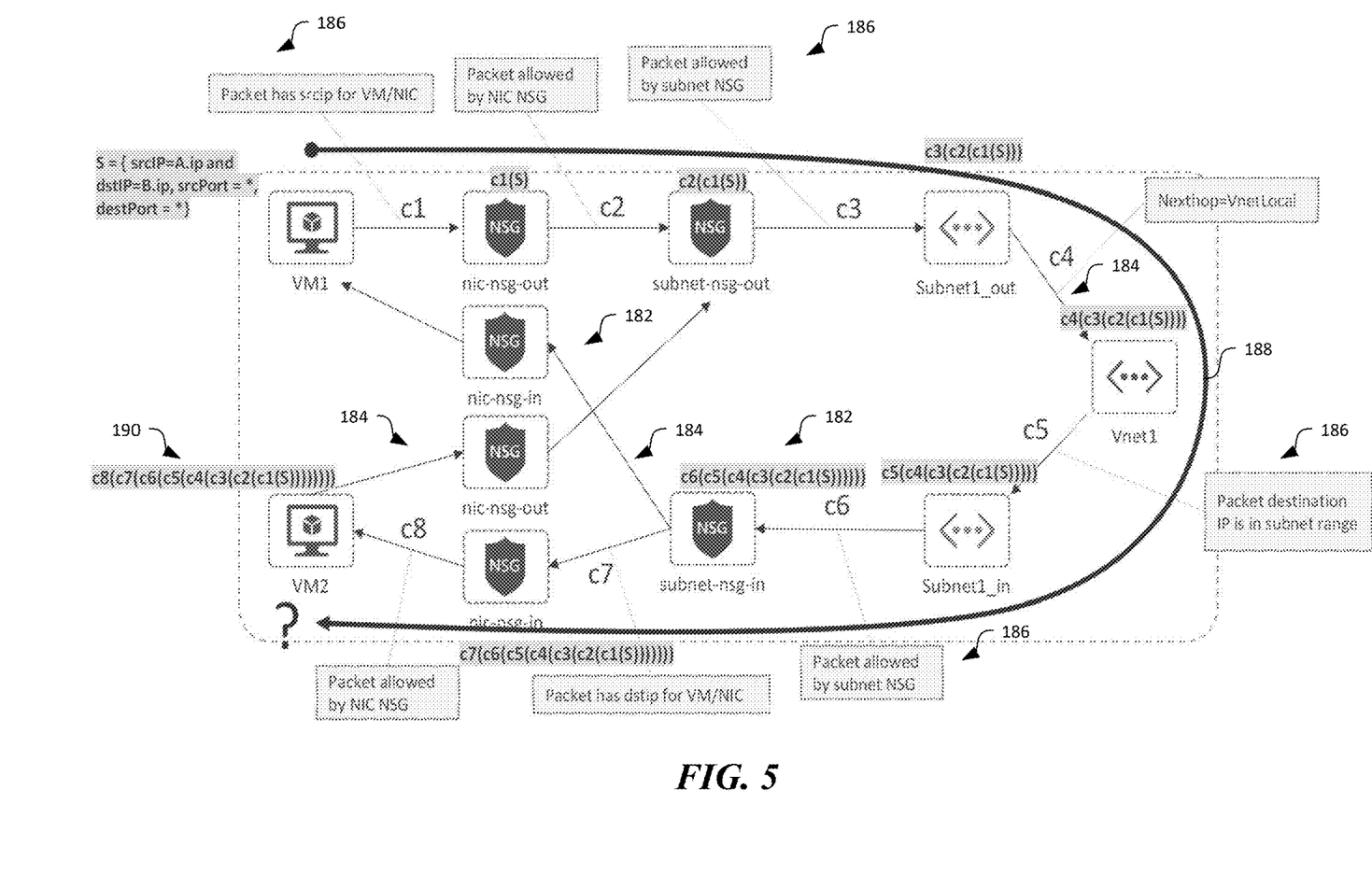
FIG. 5 illustrates a compound function in the example network graph of the virtual network in FIG. 4 in accordance with embodiments of the disclosed technology.

Based on the logic representation 156 of the network policies 150 (shown in FIG. 3A) corresponding to the compound function 190, the solver 166, e.g., the Z3 theorem prover is used to determine whether a packet having a source IP address value and source port value of the first VM and a destination IP address value and destination port value of the second VM can reach the second VM. The reachability between the first and second VMs is confirmed only if there exists an assignment of values to the packet fields such that all the constraints of the compound function 190 are satisfied. In the illustrated example in FIG. 3B, the output from the solver 166 is shown as a verification result 158 according to which a node representing "X" can reach a node representing "Z" via another node representing "Y" but not directly reach the node representing "Z."

Several embodiments of the network verifier 125 described above can thus allow tenants to efficiently test and/or troubleshoot network configuration issues in virtual networks 146. The network verifier 125 can receive a query 154 as input, analyzes network paths 188 in the virtual networks 146, collect constraints along the network path 188, and conjoin the constraints. The network verifier can then compile the conjoined constraints into a logic representation 156 and use a solver 166 to solve the conjoined constraints to determine whether reachability between two endpoints in the virtual network 146 is preserved. Several embodiments of the network verifier 125 can also output and indicate to the tenants which node on the network graph 188 that caused a packet to be dropped, as described in more detail below with reference to FIG. 6. As such, tenants can readily test modifications of network policies and troubleshoot any misconfigurations in the virtual networks 146 before such modification is deployed in the virtual networks 146.

Figure 4:
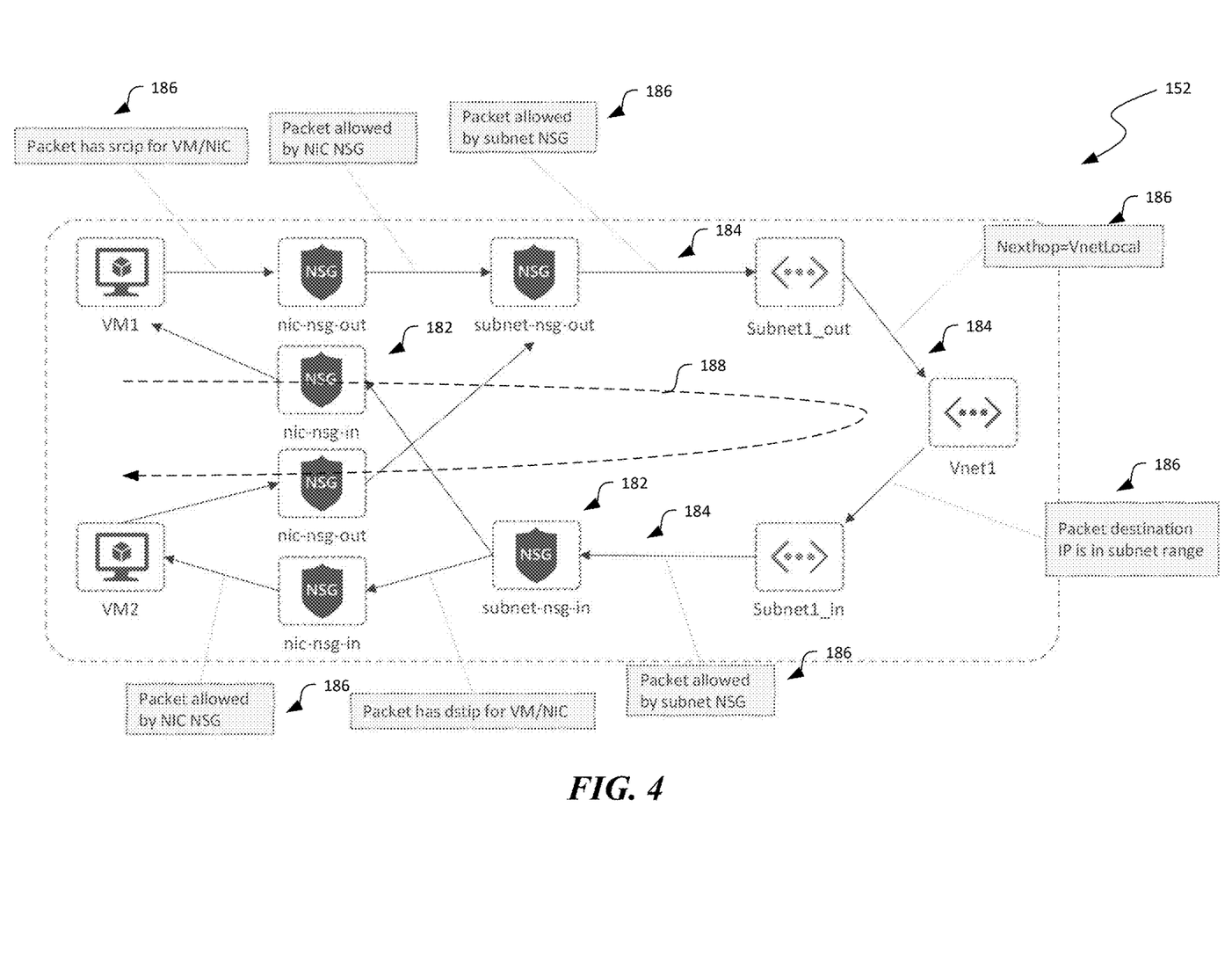
FIG. 4 illustrates an example network graph of a virtual network derived from corresponding network policies of the virtual network in accordance with embodiments of the disclosed technology.

FIG. 4 illustrates an example network graph 152 of a virtual network 146 in accordance with embodiments of the disclosed technology. As shown in FIG. 4, each node 182 in the network graph represents a resource in the virtual network 146 that performs some packet forwarding function in a network path 188. For example, VM1 is a virtual machine in this network graph 152. All packets originating in VM1 have a specific source address assigned to VM1 and a corresponding NIC and transition to the NIC-NSG-out node. The NIC-NSG-out node represents outbound rules in the NSG policy applied to the NIC. Packets that are allowed by the outbound NIC policy take the subsequent edge that connects to the subnet-NSG-out node. The subnet-NSG-node represents the outbound rules in the NSG policy applied to a subnet.

Packets that are allowed by the outbound subnet policy take the subsequence edge 184 that connects to the subnet1_out node 182. The subnet1_out node 182 represents the user-defined routing rules applied in the subnet. Packets targeting destination inside the same virtual network 146 evaluate with a "nexthop" of "vnetlocal" per the user-defined routing policy. Such packets take the subsequent edge 184 that connects to the "Vnet1" node 182. The "Vnet1" node 182 represents the virtual network comprising the subnets that host VM1 and VM2. If the destination address of the packets is set to VM2, then the packets take the subsequent edge to subnet1_in node 182. Packets are then forwarded to the subnet-NSG-in node 182. The subnet-NSG-in node 182 represents an inbound NSG policy applied to the subnet. The packets allowed by the inbound NSG policy now take the subsequent edge to the NIC-NSG-in node 182. The NIC-NSG-in node 182 represents the inbound NSG policy applied to the NIC connected to VM2. Packets allowed by this policy take the subsequent edge to finally reach VM2.

FIG. 5 illustrates a compound function 190 in the example network graph of the virtual network in FIG. 4 in accordance with embodiments of the disclosed technology. As shown in FIG. 5, packets from VM1 can have certain metadata represented by "S" having, for instance, source IP address, Destination IP address, source port, destination port, etc. Function C1 can be configured to determine whether the packets include a source IP address that corresponds to VM1 and the corresponding NIC. Output of the function C1 is then used as input to function C2 to determine whether the packets are allowed by the NIC NSG. Output from function C2 is then used as input to function C3 to determine whether the packets are allowed by subnet NSG. The operations continue until the network path reaches VM2 to derive a compound function 190, e.g., "c8(c7(c6(c5(c4(c3(c2(c1(S))))))))."

Figure 6:
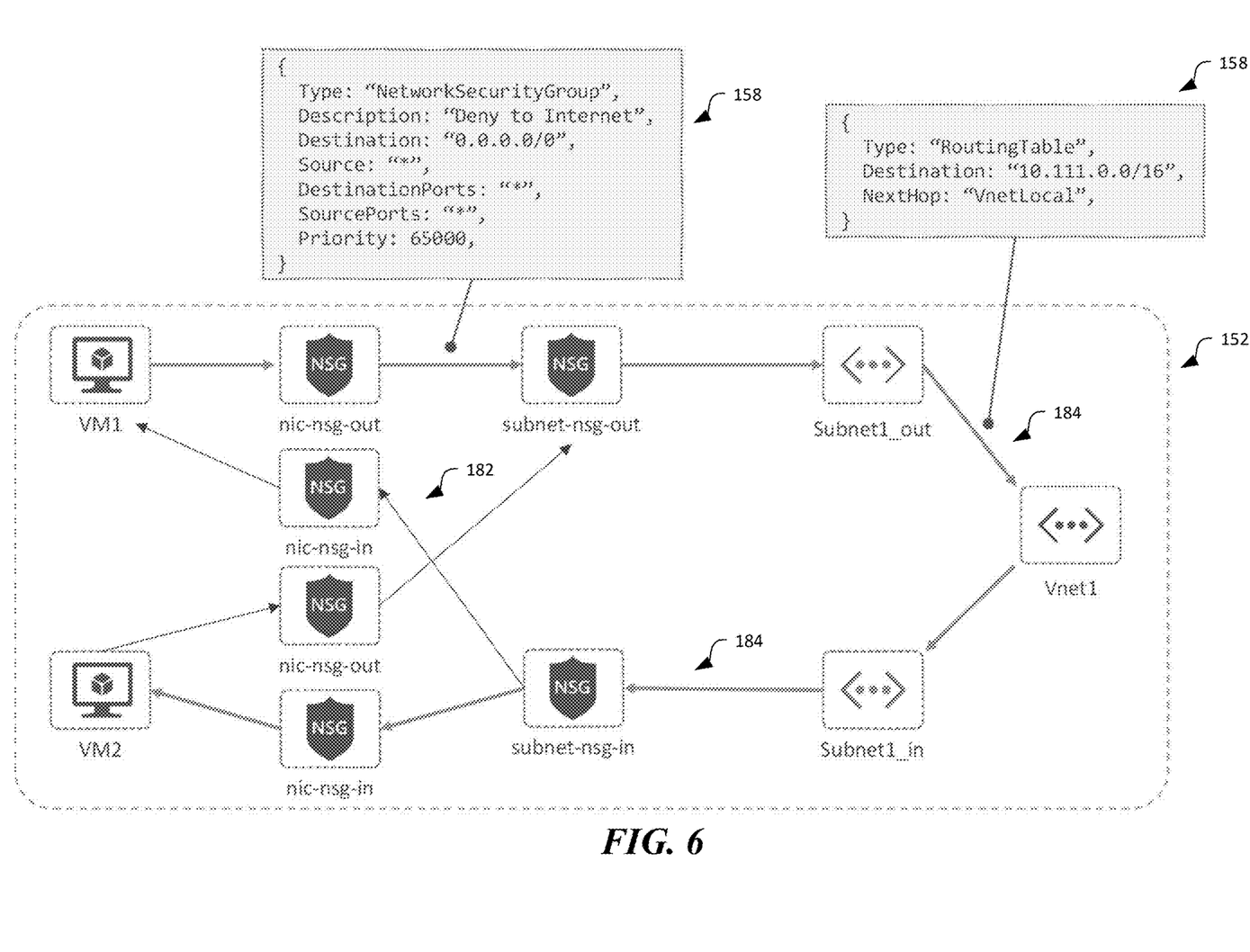
FIG. 6 is a schematic block diagram illustrating example verification output from the network verifier in accordance with embodiments of the disclosed technology.

FIG. 6 is a schematic block diagram illustrating example verification output 158 from the network verifier 125 in accordance with embodiments of the disclosed technology. As shown in FIG. 6, in certain embodiments, the network verifier 125 (shown in FIG. 3A) can also be configured to output verification results 158 at each node 182 on the network graph 152. For example, the following illustrates an evaluation result of a routing table from Subnet1_out to Vnet1:

```
{
    Type: "RoutingTable",
    Destination: "10.111.0.0/16",
    NextHop: "VnetLocal",
}
```

As shown above, the example above shows that a packet is forwarded to "VnetLocal" to a node 182 with a destination IP of "10.111.0.0/16." In another example, the following illustrates another evaluation result of an NSG that denied access to a packet:

```
{
    Type: "NetworkSecurityGroup",
    Description: "Deny to Internet",
    Destination: "0.0.0.0/0",
    Source: "*",
    DestinationPorts: "*",
    SourcePorts: "*",
    Priority: 65000,
}
```

In the example above, all traffic to the Internet is blocked at the NSG node 182. Several embodiments of the network verifier can also indicate to the tenants which node 182 on the network graph that caused a packet to be dropped. As such, tenants can readily troubleshoot any misconfigurations in the virtual networks 146 (shown in FIG. 2).

Figure 7:
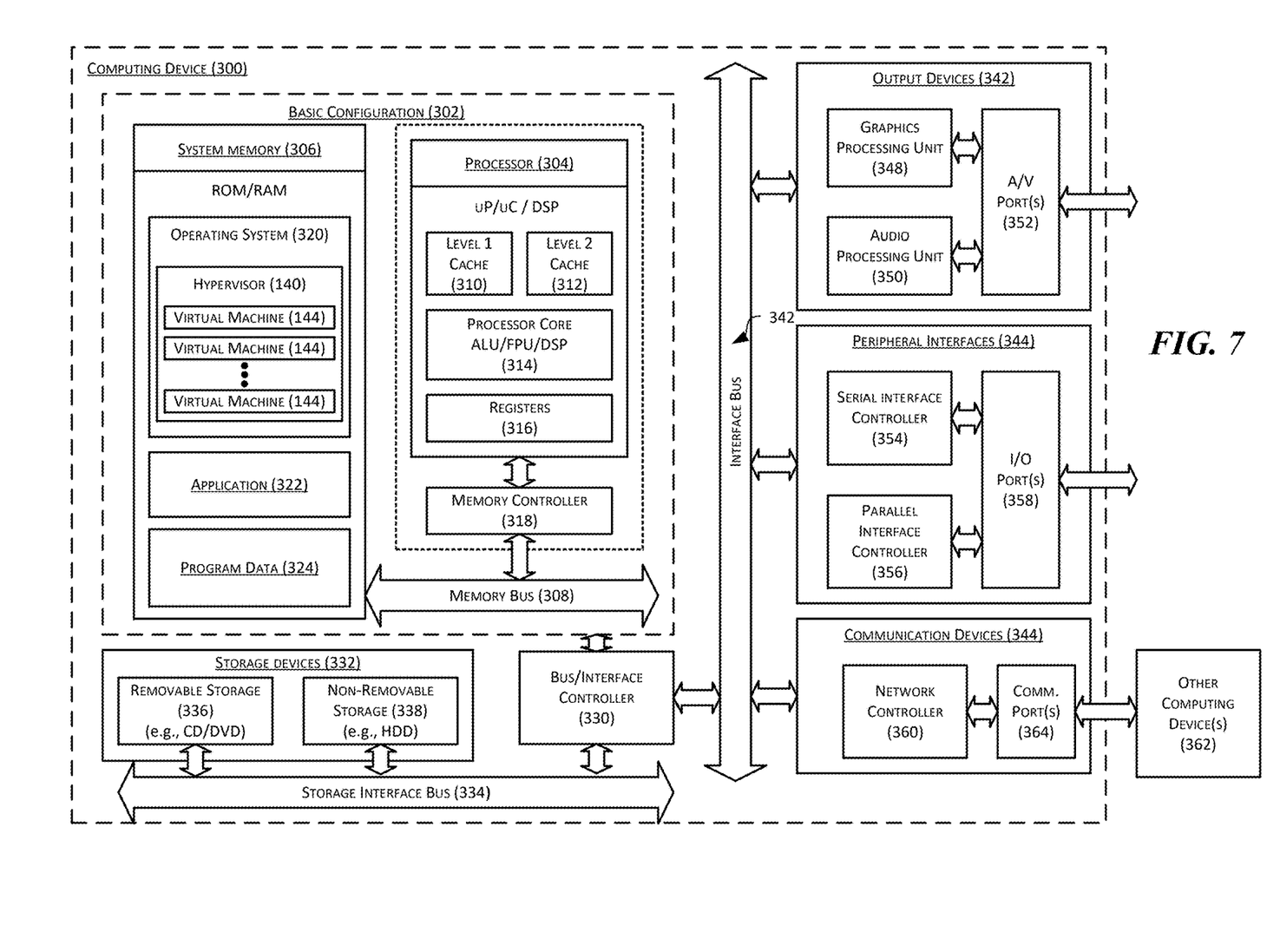
FIG. 7 is a computing device suitable for certain components of the distributed computing system in FIG. 1.

FIG. 7 is a computing device 300 suitable for certain components of the distributed computing system 100 in FIG. 1. For example, the computing device 300 can be suitable for the hosts 106, the client devices 102, or the network verifier 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 7, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless webwatch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of network configuration verification in a distributed computing system supporting one or more virtual networks, the method comprising:
    based on network policies corresponding to a virtual network implemented in the distributed computing system, generating an intermediate representation of the virtual network, the intermediate representation including enforcement points of the network policies, wherein the enforcement points represent nodes of a network graph, the nodes interconnected with one another by edges representing packet transmissions or transformations;
    identifying a network path for a packet from a first endpoint to a second endpoint in the generated intermediate representation;
    generating a logical representation by compiling conjoined individual constraints of the network policies; and
    based on the logical representation, verifying that the packet from the first endpoint is reachable by the second endpoint in the virtual network by solving the conjoined individual constraints to determine whether the packet, having a source IP address value and source port value of the first endpoint and a destination IP address value and destination port value of the second endpoint can reach the second endpoint, wherein reachability between the first and second endpoints is confirmed only if there exists an assignment of values to packet fields of the packet such that the conjoined individual constraints are satisfied.

2. The method of claim 1, further comprising:
    in response to determining that an assignment of values to packet fields of the packet exists, outputting an indication that the first endpoint is reachable to the second endpoint in the virtual network; and
    in response to determining that an assignment of values to packet fields of the packet does not exist, outputting an indication that the first endpoint is not reachable to the second endpoint in the virtual network.

3. The method of claim 1 wherein:
    the network policies each includes one or more rules representing the constraints on processing the packet; and
    the one or more rules representing a network security group, a route table, a firewall, an application security group, a virtual wide area network, or virtual peering.

4. The method of claim 1 wherein:
    the network policies each includes one or more rules representing the constraints on processing the packet; and
    generating the intermediate representation includes encoding nodes in the intermediate representation with a function configured to recursively evaluate the one or more rules of one of the network policies.

5. The method of claim 1 wherein:
    the intermediate representation includes edges representing transmission or transformation of packets in the virtual network;
    the network policies each includes one or more rules representing the constraints on processing the packet; and
    generating the intermediate representation includes:
    encoding nodes in the intermediate representation with a function configured to recursively evaluate the one or more rules of one of the network policies; and
    attaching an annotation to each of the edges, the annotation indicating the one or more rules effective for the each of the edges.

6. The method of claim 1 wherein:
    the network policies each includes one or more rules representing the constraints on processing the packet;
    generating the intermediate representation includes encoding nodes in the intermediate representation with a function configured to recursively evaluate the one or more rules of one of the network policies; and
    representing conjoined individual constraints includes conjoining multiple recursive functions of at least some of the nodes along the identified network path.

7. The method of claim 1 wherein generating the intermediate representation includes:
    generating the intermediate representation as a logic representation of the conjoined individual constraints; and
    converting the logic representation into a code corresponding to a solver that is configured to determine whether an assignment of values to packet fields of the packet exists such that all the conjoined individual constraints can be satisfied.

8. The method of claim 2, further comprising:
    subsequent to determining that the assignment of values to packet fields of the packet exists,
    receiving a modification to one of the network policies; and
    upon receiving the modification,
    regenerating a network graph based on the received modification to one of the network polices; and
    repeating the identifying, generating, compiling, and solving operations to determine whether an assignment of values to packet fields of the packet exists such that all the conjoined individual constraints can be satisfied.

9. The method of claim 1 wherein the enforcement points correspond to virtual machines, network security groups, subnets, or virtual networks.

10. A computing device in a distributed computing system supporting a virtual network, the computing device comprising:
    a processor; and
    a memory operatively coupled to the processor, the memory including instructions that, when executed by the processor, cause the computing device to:
    identify a network path for a packet from a first endpoint to a second endpoint in an intermediate representation of the virtual network;
    generate a logical representation of conjoined individual constraints of network policies in the virtual network, the intermediate representation including enforcement points of the network policies, wherein the enforcement points represent nodes of a network graph, the nodes interconnected with one another by edges representing packet transmissions or transformations; and based on the logical representation, verifying that the packet from the first endpoint is reachable by the second endpoint in the virtual network by solving the conjoined individual constraints to determine whether the packet, having a source IP address value and source port value of the first endpoint and a destination IP address value and destination port value of the second endpoint can reach the second endpoint, wherein reachability between the first and second endpoints is confirmed only if there exists an assignment of values to packet fields of the packet such that the conjoined individual constraints are satisfied.

11. The computing device of claim 10 wherein:
the network policies each includes one or more rules representing the constraints on processing the packet; and
each node in the intermediate representation is encoded with a function configured to recursively evaluate the one or more rules of one of the network policies.

12. The computing device of claim 10 wherein:
the intermediate representation includes edges representing transmission or transformation of packets in the virtual network;
the network policies each includes one or more rules representing the constraints on processing the packet;
each node in the intermediate representation is encoded with a function configured to recursively evaluate the one or more rules of one of the network policies; and
each of the edges is annotated with an indication of the one or more rules effective for the each of the edges.

13. The computing device of claim 10 wherein:
the network policies each includes one or more rules representing the constraints on processing the packet; and
each node in the intermediate representation is encoded with a function configured to recursively evaluate the one or more rules of one of the network policies;
further comprising instructions that, when executed by the processor, cause the computing device to determine that an assignment of values to packet fields of the packet exists by conjoining multiple recursive functions of at least some of the nodes along the identified network path.

14. The computing device of claim 10 wherein generate the logical representation comprises:
generate the logical representation as a logic representation of the conjoined individual constraints; and
convert the logic representation into a code corresponding to a solver that is configured to determine whether an assignment of values to packet fields of the packet exists such that all the conjoined individual constraints can be satisfied.

15. The computing device of claim 10 wherein the intermediate representation includes enforcement points of network policies in the virtual network; and wherein the memory includes additional instructions executable by the processor to cause the computing device to:
determine that an assignment of values to packet fields of the packet exists;
receive a modification to one of the network policies; and
upon receiving the modification,
regenerate another intermediate representation based on the received modification to one of the network polices; and
determine whether an assignment of values to packet fields of the packet exists such that all the conjoined individual constraints can be satisfied.

16. A method of network configuration verification in a distributed computing system supporting a virtual network, the method comprising:
identifying a network path for a packet from a first endpoint to a second endpoint in an intermediate representation of the virtual network, the intermediate representation including enforcement points of network policies in the virtual network, wherein the enforcement points represent nodes of a network graph, the nodes interconnected with one another by edges representing packet transmissions or transformations;
generating a logical representation of conjoined individual constraints along the identified network path; and
based on the logical representation, verifying that the packet from the first endpoint is reachable by the second endpoint in the virtual network by solving the conjoined individual constraints to determine whether the packet, having a source IP address value and source port value of the first endpoint and a destination IP address value and destination port value of the second endpoint can reach the second endpoint, wherein reachability between the first and second endpoints is confirmed only if there exists an assignment of values to packet fields of the packet such that the conjoined individual constraints are satisfied.

17. The method of claim 16 wherein:
the network policies each includes one or more rules representing the constraints on processing the packet; and
each node in the intermediate representation is encoded with a function configured to recursively evaluate the one or more rules of one of the network policies.

18. The method of claim 16 wherein:
the network policies each includes one or more rules representing the constraints on processing the packet;
each node in the intermediate representation is encoded with a function configured to recursively evaluate the one or more rules of one of the network policies; and
each of the edges is annotated with an indication of the one or more rules effective for the each of the edges.

19. The method of claim 16 wherein:
the network policies each includes one or more rules representing the constraints on processing the packet;
each node in the intermediate representation is encoded with a function configured to recursively evaluate the one or more rules of one of the network policies; and
further comprising determining that an assignment of values to packet fields of the packet exists includes conjoining multiple recursive functions of at least some of the nodes along the identified network path.

20. The method of claim 16, further comprising determining that an assignment of values to packet fields of the packet exists by generating the logical representation as a logic representation of the conjoined individual constraints; and
converting the logical representation into a code corresponding to a solver that is configured to determine whether an assignment of values to packet fields of the packet exists such that all the conjoined individual constraints can be satisfied.

* * * * *